(12) United States Patent
Yone et al.

(10) Patent No.: US 9,108,641 B2
(45) Date of Patent: Aug. 18, 2015

(54) CONTROL APPARATUS FOR VEHICLES (71) Applicant: HONDA MOTOR CO., LTD., Minato-ku, Tokyo (JP)

(72) Inventors: Tatsuhiro Yone, Utsunomiya (JP); Hideyuki Okamoto, Utsunomiya (JP); Takashi Yamaguchi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 14/154,342

(22) Filed: Jan. 14, 2014

(65) Prior Publication Data

US 2014/0200792 A1 Jul. 17, 2014

(30) Foreign Application Priority Data

Jan. 16, 2013 (JP) ................................. 2013-005710

(51) Int. Cl.
*F02D 41/00* (2006.01)
*B60W 40/12* (2012.01)
*F02D 41/04* (2006.01)
*F02D 41/06* (2006.01)

(52) U.S. Cl.
CPC ............. *B60W 40/12* (2013.01); *F02D 41/009* (2013.01); *F02D 41/042* (2013.01); *F02D 41/062* (2013.01); *F02D 2041/0092* (2013.01); *F02D 2041/0095* (2013.01)

(58) Field of Classification Search
CPC . F02D 41/009; F02D 41/0092; F02D 41/021; F02D 41/06
USPC ............................ 123/494, 406.18; 73/114.26
See application file for complete search history.

(56) References Cited

U.S. PATENT DOCUMENTS

| 5,447,143 | A  |   | 9/1995 | Ott et al. |
| 5,522,352 | A  | * | 6/1996 | Adachi et al. .............. 123/90.15 |
| 5,622,153 | A  |   | 4/1997 | Ott et al. |
| 6,681,173 | B2 | * | 1/2004 | Turner et al. .................. 701/113 |
| 7,076,361 | B2 | * | 7/2006 | Wang et al. .................... 701/115 |
| 7,370,517 | B2 |   | 5/2008 | Rupp et al. |
| 8,109,136 | B2 | * | 2/2012 | Moessner ................. 73/114.26 |

(Continued)

FOREIGN PATENT DOCUMENTS

DE 4230616 A1 3/1994
DE 4434833 A1 4/1996

(Continued)

OTHER PUBLICATIONS

Search Report dated Apr. 8, 2014 issued over the corresponding German Patent Application No. 10-2014 200631.7 with the English translation thereof.

(Continued)

*Primary Examiner* — Thomas Moulis
(74) *Attorney, Agent, or Firm* — Carrier Blackman & Associates, P.C.; Joseph P. Carrier; William D. Blackman (57) ABSTRACT

A control apparatus for controlling a vehicle includes an actuator ECU. The actuator ECU acquires a crankshaft angle (stopped crankshaft angle) at a time that an engine stops operating. The actuator ECU identifies a crankshaft angle depending on an edge of a first TDC pulse of a TDC pulse signal immediately after the engine has been started or restarted. Then, using the identified crankshaft angle as a reference, the actuator ECU corrects the stopped crankshaft angle.

5 Claims, 8 Drawing Sheets

(56) References Cited

U.S. PATENT DOCUMENTS

| | | | |
|---|---|---|---|
| 2002/0112683 A1* | 8/2002 | Kunz | 123/90.15 |
| 2005/0229884 A1* | 10/2005 | Kunz et al. | 123/90.17 |
| 2005/0278109 A1* | 12/2005 | Ando | 701/112 |
| 2006/0016411 A1* | 1/2006 | Flanagan et al. | 123/179.3 |
| 2007/0261670 A1* | 11/2007 | Nguyen et al. | 123/406.59 |
| 2008/0125957 A1 | 5/2008 | Rupp et al. | |
| 2011/0144891 A1 | 6/2011 | Nakamura et al. | |
| 2012/0013057 A1 | 1/2012 | Nemoto | |

FOREIGN PATENT DOCUMENTS

| | | |
|---|---|---|
| DE | 19639541 A1 | 12/1997 |
| DE | 10323486 A1 | 12/2004 |
| DE | 10 2010 062675 A1 | 6/2011 |
| DE | 10 2010 042533 A1 | 4/2012 |
| DE | 11 2010 001470 T5 | 6/2012 |
| JP | 11-132030 A | 5/1999 |
| JP | 2005-320945 A | 11/2005 |
| JP | 2010-230135 A | 10/2010 |
| JP | 2011-252553 A | 12/2011 |

OTHER PUBLICATIONS

Examination Report dated May 26, 2015 issued over the corresponding German Patent Application No. 10 2014 200631.7.

* cited by examiner

PRIOR ART

CONTROL APPARATUS FOR VEHICLES

CROSS-REFERENCE TO RELATED APPLICATION

This application is based upon and claims the benefit of priority from Japanese Patent Application No. 2013-005710 filed on Jan. 16, 2013, the contents of which are incorporated herein by reference.

BACKGROUND OF THE INVENTION

1. Field of the Invention

The present invention relates to a vehicle control apparatus for correcting crankshaft position information, which is representative of the rotational position of a crankshaft disposed in a vehicle engine, and controlling the engine based on the corrected crankshaft position information.

2. Description of the Related Art

According to Japanese Laid-Open Patent Publication No. 2005-320945 (hereinafter referred to as "JP2005-320945A"), a crankshaft signal, which is representative of the rotational position of a crankshaft, is monitored during a time that the engine is stopped, and after the engine is started, the engine cylinders are determined based on the crankshaft signal in the stopped state and a cam signal, the aspect of which differs as each cylinder undergoing combustion, is switched.

SUMMARY OF THE INVENTION

According to the disclosure of JP2005-320945A, a crankshaft angle sensor detects the rotational position of a crankshaft, and pulses depending on the detected rotational position (crankshaft angle) are supplied as a crankshaft signal. Because of variations in accuracy that the crankshaft angle sensor suffers from, the crankshaft angle represented by the crankshaft signal supplied from the crankshaft angle sensor may differ by ±several pulses from the crankshaft angle detected by the crankshaft angle sensor.

According to the process disclosed by JP2005-320945A, even if the crankshaft angle represented by the crankshaft signal supplied from the crankshaft angle sensor varies slightly, the crankshaft angle can appropriately be detected using a cam signal in combination with the crankshaft signal.

However, when information representing a rotational position of a crankshaft (crankshaft position information) is used in a control process for controlling an engine or a vibration suppressing control process performed by an active vibroisolating support device for suppressing vibrations transmitted from an engine to a vehicle body by energizing actuators, due to the need to carry out the control process with higher accuracy, it is necessary to accurately detect the rotational position of the crankshaft.

It is an object of the present invention to provide a vehicle control apparatus, which is capable of accurately detecting and acquiring the rotational position of a crankshaft.

To achieve the above object, in accordance with the present invention, there is provided a control apparatus for a vehicle having a multi-cylinder engine including a crankshaft rotatably disposed therein and a camshaft rotatably disposed therein, comprising a crankshaft position acquiring unit configured to acquire crankshaft position information representing a rotational position of the crankshaft at each predetermined angular interval in response to rotation of the crankshaft, a camshaft signal acquiring unit configured to acquire camshaft signals having different modes, which switch from one to another in association with cylinders of the engine that operate in successive combustion strokes, in response to rotation of the camshaft of the engine, and a correcting unit configured to correct the crankshaft position information acquired from the crankshaft position acquiring unit based on the camshaft signals acquired from the camshaft signal acquiring unit.

The present invention may be constituted by any one of the following arrangements [1] through [5]:

[1] The correcting unit acquires from the crankshaft position acquiring unit stopped crankshaft position information, which is representative of crankshaft position information at a time that the engine stops operating, acquires from the crankshaft position acquiring unit switching crankshaft position information, which is representative of crankshaft position information at a time that the camshaft signals switch from one to another when the engine is started or restarted, and corrects the stopped crankshaft position information based on the acquired switching crankshaft position information.

A rotational position of the crankshaft at the time that the camshaft signals are switched from one signal to another signal is uniquely determined. According to the present invention, with the above arrangement, even if the crankshaft position information, which is acquired when the engine is stopped (stopped crankshaft position information) suffers from variations in accuracy, the stopped crankshaft position information can be corrected based on crankshaft position information at the time that the camshaft signals are switched (switching crankshaft angle). Therefore, it is possible to acquire highly accurate stopped crankshaft position information. In other words, any desired rotational position can be identified accurately based on the rotational position of the crankshaft, which is represented by the corrected stopped crankshaft position information (i.e., the rotational position of the crankshaft at the time that the engine is stopped).

[2] The control apparatus further comprises an engine control unit configured to control the engine. The engine control unit stops the engine such that none of the pistons in any of the cylinders stops at a top dead center position thereof when the engine is stopped. The correcting unit acquires, as the switching crankshaft position information, crankshaft position information at the time that the camshaft signals switch from one to another for a first time after the engine has been started or restarted.

With the above arrangement, when the engine stops operating, the engine is stopped, i.e., each piston is stopped at a position except for a top dead center position, and such that none of the pistons has reached the top dead center position thereof. Therefore, even if the durations (pulse durations) required until the camshaft signals switch from one to another differ from each other among the cylinders, it is possible to quickly determine which cylinder has reached its top dead center position at the time that the camshaft signals switch from one to another for a first time after the time at which the engine is started or restarted. Such a control process makes it possible to acquire accurate crankshaft position information at an earlier stage, by correcting the stopped crankshaft position information using the rotational position of the crankshaft determined at that time.

[3] The control apparatus further comprises an engine control unit configured to control the engine. The engine control unit stops the engine such that a rotational position of the camshaft when the engine is stopped will not be a rotational position at which the camshaft signals switch from one to another.

Since the engine control unit stops the engine at a position other than the rotational position of the camshaft at the time that the camshaft signals switch from one to another, the engine stops in a condition such that no cylinder has reached its top dead center position. Thus, it is possible to quickly determine which cylinder has reached its top dead center position at the time that the camshaft signals switch from one to another for the first time after the engine has been started or restarted. Accordingly, accurate crankshaft position information can be acquired at an earlier stage, by correcting the stopped crankshaft position information using the crankshaft position information (switching crankshaft position information) acquired at that time.

[4] The control apparatus is adapted to control an active vibroisolating support device which is mounted on a vehicle body and supports the engine, and which performs a vibration suppressing control process of suppressing vibrations transmitted from the engine to the vehicle body by energizing an actuator.

The control apparatus comprises an actuator control unit configured to energize the actuator, and the actuator control unit includes the correcting unit. The actuator control unit acquires the stopped crankshaft position information from the crankshaft position acquiring unit. The actuator control unit establishes a predetermined rotational position of the crankshaft from the stopped crankshaft position information. In addition, the actuator control unit begins the vibration suppressing control process by the actuator when a rotational position of the crankshaft, which is represented by the crankshaft position information acquired from the crankshaft position acquiring unit, reaches the predetermined rotational position, at the time that the engine is started or restarted.

Since the rotational position of the crankshaft represents physical positional information, it is less likely to vary even if the engine is started by different types of engine starters. Also, the rotational position of the crankshaft is less liable to deviate from the time at which the engine produces rolling natural vibrations. Accordingly, the timing accuracy of the vibration suppressing control process is made higher than if the vibration suppressing control process were performed depending on engine rotational speed (vibration beginning time).

Furthermore, inasmuch as the accuracy of the rotational position of the crankshaft is high at the time that operation of the engine is stopped, it is possible to accurately establish a predetermined rotational position from the stopped crankshaft position information.

The predetermined rotational position refers to a rotational position of the crankshaft at a time that rolling natural vibrations are produced. When the vibration suppressing control process carried out by the actuator begins from the rotational position at which rolling natural vibrations are produced, vibrations caused by rolling natural vibrations and which are transmitted from the engine to the vehicle body are efficiently suppressed.

[5] The control apparatus further comprises an engine control unit configured to control the engine.

The engine control unit acquires the stopped crankshaft position information from the crankshaft position acquiring unit. The engine control unit acquires, as the switching crankshaft position information, crankshaft position information from the crankshaft position acquiring unit immediately after the camshaft signals have switched from one to another, after a pulse-free period in which the crankshaft position acquiring unit is incapable of acquiring crankshaft position information due to a gear-tooth-free area of the crankshaft, at the time that the engine is started or restarted. The engine control unit corrects the stopped crankshaft position information based on the acquired switching crankshaft position information. Additionally, the engine control unit establishes an ignition timing of the engine based on the corrected stopped crankshaft position information, and controls the engine based on the established ignition timing.

The ignition timing of the engine is established based on a rotational position of the crankshaft which is located past the gear-tooth-free area of the crankshaft at the time that the camshaft signals switch from one to another. Consequently, the ignition timing of the engine is acquired more reliably.

As described above, the control process performed by the control apparatus is divided into a control process for acquiring the rotational position of the crankshaft by which a control timing of the active vibroisolating support device is established, and a control process for acquiring the rotational position of the crankshaft by which an ignition timing of the engine is established. In each of the aforementioned control processes, the rotational position of the crankshaft can be detected quickly and accurately.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

[Overall Configuration of Control Apparatus (Vehicle Control Apparatus) for Controlling an Active Vibroisolating Support Device]

Figure 1:
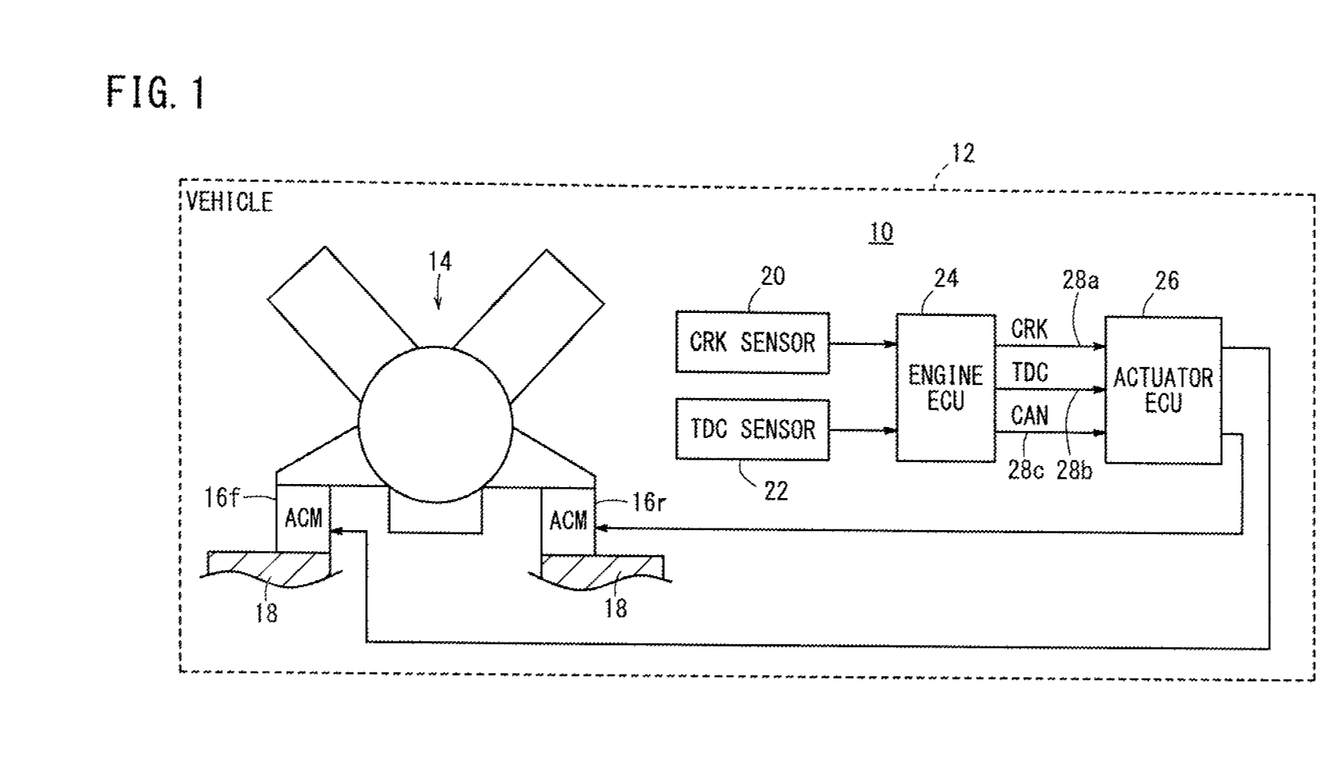
FIG. 1 is a schematic view, partially in block form, of a control apparatus for controlling an active vibroisolating support device according to an embodiment of the present invention.

As shown in FIG. 1, a control apparatus 10 for controlling an active vibroisolating support device according to an embodiment of the present invention constitutes one type of vehicle control apparatus that is applied to a vehicle 12. The control apparatus 10 performs a vibration suppressing control process for energizing active control mounts 16*f*, 16*r* (hereinafter referred to as "ACMs 16*f*, 16*r*"), which function as active vibroisolating support devices that suppress vibrations transmitted from a multi-cylinder engine 14 to a vehicle body 18.

The control apparatus 10 is used, for example, to suppress vibrations of the vehicle body 18 that are caused by rolling natural vibrations (rolling resonance) which are generated in the engine 14 during a motoring period of the engine 14. The motoring period refers to a period from a time at which the engine 14 is started or restarted to the time at which the engine 14 is fired for the first time.

The ACMs 16f, 16r, which are disposed on front and rear ends of the engine 14, are capable of periodically expanding and contracting along vertical directions. The ACMs 16f, 16r elastically support the engine 14 on a frame of the vehicle body 18. Starting of the engine 14 can be defined, for example, as bringing the engine 14 into operation from a stopped state in response to an action taken by the driver of the vehicle 12. Restarting of the engine 14 can be defined, for example, as automatically stopping the engine 14 on a part of the vehicle 12, and then automatically bringing the engine 14 into operation again from the stopped state. However, starting and restarting of the engine 14 are not limited to the above definitions, and the engine 14 may be started or restarted according to other processes.

The control apparatus 10 includes a crankshaft pulse sensor 20 (crankshaft rotational position acquiring unit, crankshaft position acquiring unit), a top-dead-center sensor 22 (top-dead-center detecting unit, cam signal acquiring unit), an engine ECU 24 (engine control unit), and an actuator ECU 26 (actuator control unit, correcting unit).

The crankshaft pulse sensor 20 (hereinafter referred to as a "CRK sensor 20") supplies a crankshaft signal (hereinafter referred to as a "CRK pulse signal") to the engine ECU 24. The CRK pulse signal is made up from a series of pulses spaced at predetermined angular intervals, which are generated as the crankshaft of the engine 14 rotates. More specifically, the CRK sensor 20 comprises a rotor fixedly mounted on the crankshaft, and a magnetic detector disposed in facing relation to an outer circumferential surface of the rotor. The rotor has a plurality of gear teeth on the outer circumferential surface thereof. The gear teeth on the rotor are spaced at predetermined angular intervals, and the outer circumferential surface includes an area that is free of gear teeth (gear-tooth-free area). The magnetic detector comprises a plurality of magnetoresistive elements (MREs) and a biasing magnet.

As the rotor rotates with the crankshaft, the magnetic detector of the CRK sensor 20 detects the gear teeth as pulses, which are spaced at the above angular intervals, and detects the gear-teeth-free area as a substantially 0 level. Therefore, the CRK sensor 20 is capable of producing the aforementioned CRK pulse signal at respective rotational positions of the crankshaft, except for the position corresponding to the 0 level. The engine ECU 24 can grasp the rotational position (crankshaft angle) of the crankshaft by counting the number of pulses represented by the CRK pulse signal.

The top-dead-center sensor 22 (hereinafter referred to as a "TDC sensor 22") comprises a rotor, which is fixedly mounted on the camshaft of the engine 14, and a magnetic detector, which is disposed in facing relation to an outer circumferential surface of the rotor. The rotor has a plurality of long teeth, which have respective angles greater than the gear teeth of the CRK sensor 20, the angles being different from each other. As the camshaft rotates, the magnetic detector of the TDC sensor 22 detects the long teeth as pulses having pulse durations longer than the pulses of the CRK pulse signal, and supplies a TDC pulse signal, which is made up of the detected pulses, to the engine ECU 24.

The crankshaft undergoes two revolutions for each one revolution of the camshaft. The long teeth correspond to respective cylinders of the engine 14. Therefore, upon rotation of the camshaft, when a cylinder is in a combustion stroke, the pulses of the TDC pulse signal switch from one to another as the cylinders switch from one to another, and pulses have different angles corresponding to the respective cylinders. Thus, the TDC sensor 22 generates a TDC pulse signal made up of pulses having different pulse durations that correspond to the respective cylinders. Consequently, by checking the TDC pulse signal supplied from the TDC sensor 22, the engine ECU 24 can grasp which one of the cylinders presently has a piston reaching the top dead center position thereof during the combustion stroke.

Since each of the CRK sensor 20 and the TDC sensor 22 comprises a magnetic sensor comprising MREs, the CRK sensor 20 and the TDC sensor 22 are capable of detecting rotational positions of the crankshaft and the camshaft during rotation thereof, even if the engine 14 has stopped. Details of the CRK sensor 20 and the TDC sensor 22 are disclosed in JP2005-320945A, for example. Therefore, the CRK sensor 20 and the TDC sensor 22 will not be described in detail below.

The engine ECU 24 controls the engine 14 based on the CRK pulse signal supplied from the CRK sensor 20 and the TDC pulse signal supplied from the TDC sensor 22. The engine ECU 24 sends the CRK pulse signal to the actuator ECU 26 through a CRK pulse signal line 28a, and sends the TDC pulse signal to the actuator ECU 26 through a TDC pulse signal line 28b. Furthermore, the engine ECU 24 sends various items of information to the actuator ECU 26 through a CAN (Controller Area Network) communication line 28c.

Based on the CRK pulse signal, the TDC pulse signal, and other various items of information, the actuator ECU 26 generates drive signals for energizing the ACMs 16f, 16r, converts the generated drive signals into drive currents, and supplies the drive currents to the ACMs 16f, 16r. Accordingly, the drive signals and the drive currents serve as control signals and currents, respectively, which are generated depending on the operational state of the engine 14 represented by the CRK pulse signal and the TDC pulse signal. When the drive currents are supplied to the ACMs 16f, 16r, the ACMs 16f, 16r periodically expand and contract in vertical directions depending on the supplied drive currents, thereby suppressing vibrations of the vehicle body 18.

[Structure of ACMs]

Figure 2:
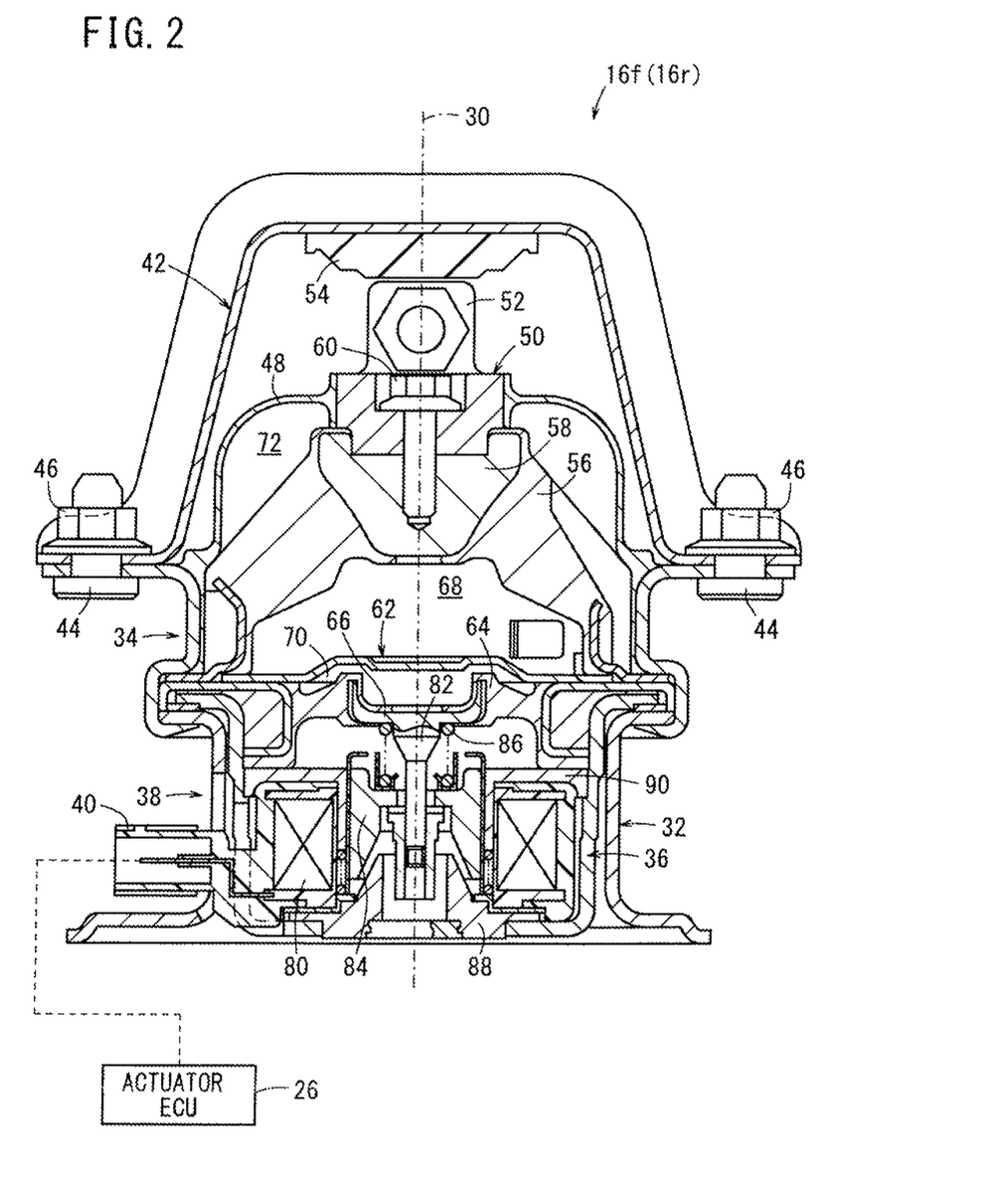
FIG. 2 is a cross-sectional view of an ACM (Active Control Mount) shown in FIG. 1.

As shown in FIG. 2, each of the ACMs 16f, 16r is formed with an axisymmetric structure with respect to an axial line 30. The ACMs 16f, 16r essentially are or the same structure as the ACMs disclosed in JP2011-252553A and JP2010-230135A, for example.

Each of the ACMs 16f, 16r has a substantially tubular lower housing 32, and a substantially tubular upper housing 34 that engages with the lower housing 32. The lower housing 32 and the upper housing 34 accommodate therein an upwardly open, substantially cup-shaped actuator case 36. The actuator case 36 houses therein an actuator 38, which is energizable by a drive signal supplied from the actuator ECU 26 through a connector 40.

The upper housing 34 is closed by a stopper 42 on an upper end thereof. The upper housing 34 and the stopper 42 are fastened to each other by bolts 44 and nuts 46. The lower housing 32, the upper housing 34, and the stopper 42 jointly define a closed inner space which accommodates therein a diaphragm 48 having an outer edge region joined by vulcanization bonding to an inner circumferential surface of the upper housing 34. A diaphragm support boss 50 is disposed centrally on the diaphragm 48, and an engine mount 52, which is fixed to the engine 14, is integrally joined to an upper surface of the diaphragm support boss 50. The stopper 42 includes a rubber stopper 54 disposed in confronting relation to the engine mount 52 for abutment against the engine mount 52.

The diaphragm 48 is disposed above a first elastic body 56 having a recess defined in an upper surface thereof. A first elastic body support boss 58 is received in the recess. A diaphragm support boss 50 is fastened to the first elastic body support boss 58 by a bolt 60.

The first elastic body 56 is disposed above a disk-shaped partition 62 having an outer circumferential portion, which is joined to the actuator case 36 by a second elastic body 64 in the form of a rubber diaphragm. The second elastic body 64 is joined between the outer circumferential portion and the actuator case 36 by vulcanization bonding. A movable member 66 (vibrating plate) is embedded centrally in the second elastic body 64 by vulcanization bonding.

The first elastic body 56 and the partition 62 jointly define therebetween a first liquid chamber 68 that is filled with a liquid. The partition 62 and the second elastic body 64 jointly define therebetween a second liquid chamber 70 that is filled with a liquid. The first elastic body 56 and the diaphragm 48 jointly define therebetween a third liquid chamber 72 that is filled with a liquid.

The actuator 38 comprises a coil 80, a substantially cylindrical rod 82 coupled to the movable member 66 and which is vertically movably disposed in the coil 80, a substantially tubular movable core 84 coupled to an outer circumferential surface of the rod 82, a spring 86 that normally urges the movable core 84 to move in a downward direction, a fixed core 88 disposed below the movable core 84 in axially confronting relation thereto, and a yoke 90 disposed radially outward of the movable core 84 and which extends over the coil 80.

When the vehicle body 18 vibrates due to rolling natural vibrations of the engine 14 during a motoring period in which the engine 14 is motored, the vibrations impose loads from the engine 14 to the vehicle body 18 and vice versa. During a period of time in which a downward load (hereinafter referred to as a "pushing load") is applied from the engine 14 to the vehicle body 18, the pushing load is transmitted from the engine 14 to the diaphragm support boss 50 and the first elastic body support boss 58, thereby elastically deforming the first elastic body 56 and reducing the volume of the first liquid chamber 68, i.e., compressing the liquid in the first liquid chamber 68. During a period of time in which an upward load (hereinafter referred to as a "pulling load") is applied to the vehicle body 18 in a direction from the vehicle body 18 to the engine 14, the pulling load elastically deforms the first elastic body 56, so as to increase the volume of the first liquid chamber 68.

The actuator ECU 26 supplies a drive current, which is based on the CRK pulse signal and the TDC pulse signal during the motoring period, to the coil 80 through the connector 40. The coil 80 is energized to attract the movable core 84 toward the fixed core 88, thereby moving the rod 82 and the movable member 66 downwardly. Downward movement of the movable member 66 elastically deforms the second elastic body 64 in a downward direction, thereby increasing the volume of the second liquid chamber 70.

The first liquid chamber 68 and the second liquid chamber 70 are held in fluid communication with each other through a communication hole defined in the partition 62. Therefore, when the volume of the second liquid chamber 70 is increased, the liquid in the first liquid chamber 68, which is compressed under the pushing load from the engine 14, flows through the communication hole in the partition 62 and into the second liquid chamber 70. As a result, the pushing load transmitted from the engine 14 to the vehicle body 18 is reduced.

When the drive current, which is supplied to the coil 80 from the actuator ECU 26, is reduced, the movable core 84, which has been elastically deformed downwardly, is released from the downward attracting force, and moves back to the upper position under the elasticity thereof. The rod 82, which is coupled to the movable core 84 and also to the movable member 66 embedded in the second elastic body 64, is pulled upwardly and moved, so as to elastically displace the second elastic body 64 in an upward direction. Consequently, the volume of the second liquid chamber 70 is reduced, thereby forcing the liquid contained therein to flow through the communication hole in the partition 62 and into the second elastic body 64, which has been depressurized under the pulling load from the engine 14. As a result, the pulling load by the engine 14 on the vehicle body 18 is reduced.

Therefore, when vibrations are produced in the vehicle body 18 during the motoring period, which repetitively apply pushing and pulling loads due to rolling natural vibrations of the engine 14, the actuator ECU 26 supplies the coil 80 of each of the ACMs 16f, 16r with a drive current made up of periodic pulses. The drive current acts to periodically move the movable member 66 vertically, thereby suppressing the vibrations of the vehicle body 18.

[Configuration of Engine ECU]

Figure 3:
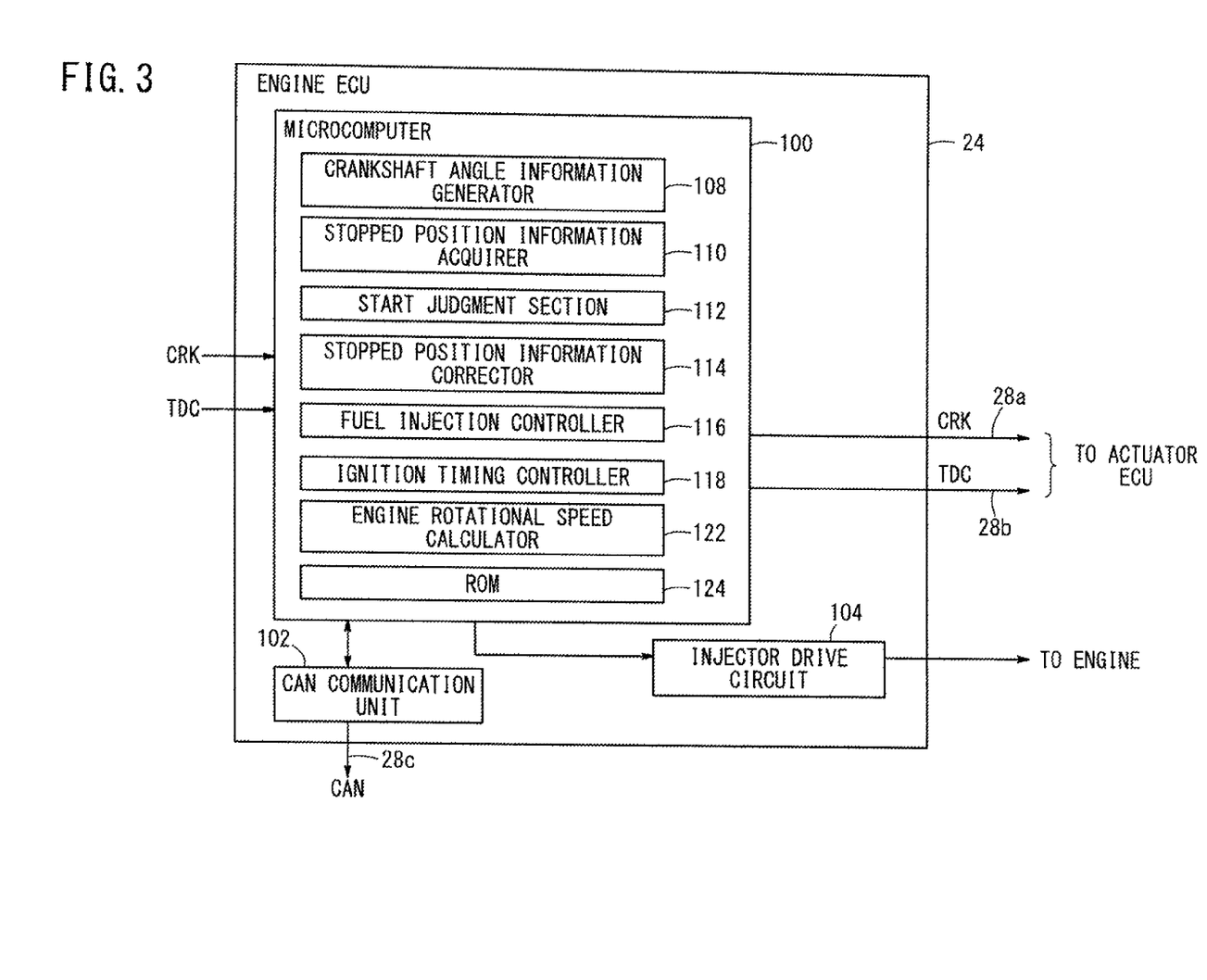
FIG. 3 is a block diagram of an engine ECU (Electronic Control Unit) shown in FIG. 1.

As shown in FIG. 3, the engine ECU 24, which serves to control the engine 14, has a microcomputer 100, a CAN communication unit 102, and an injector drive circuit 104.

In addition to a ROM 124 (memory unit), the microcomputer 100 includes a crankshaft angle information generator 108, a stopped position information acquirer 110, a start judgment section 112, a stopped position information corrector 114 (correcting unit), a fuel injection controller 116, an ignition timing controller 118, and an engine rotational speed calculator 122, which are implemented as software functions.

The crankshaft angle information generator 108 counts pulses of the CRK pulse signal supplied to the microcomputer 100, calculates a rotational position (crankshaft angle) of the crankshaft from the counted pulses, and supplies the calculated crankshaft angle as crankshaft angle information. The engine rotational speed calculator 122 calculates an engine rotational speed based on the CRK pulse signal.

The start judgment section 112 monitors the engine rotational speed, which is calculated by the engine rotational speed calculator 122, and receives a signal from a non-illustrated ignition switch of the vehicle 12. If the engine rotational speed has increased from a substantially 0 level and/or a signal is supplied to the start judgment section 112 from the ignition switch, then the start judgment section 112 judges that the engine 14 has been started or restarted, and supplies the judgment result as start judgment information. The start judgment information is stored in the ROM 124, which comprises a nonvolatile memory such as an EEPROM or the like.

The stopped position information acquirer 110 monitors whether or not the engine 14 has stopped operating. If the engine 14 has stopped operating, the stopped position information acquirer 110 acquires crankshaft angle information from the crankshaft angle information generator 108. The stopped position information acquirer 110 identifies the crankshaft angle indicated by the acquired crankshaft angle information as a crankshaft angle (hereinafter referred to as a "stopped crankshaft angle") of the crankshaft of the engine 14 that has been stopped, and supplies the identified stopped crankshaft angle and information indicating that the engine 14 is presently in a stopped state as stopped position information (stopped crankshaft position information). The stopped position information is stored in the ROM 124.

As described above, even if the engine 14 has stopped, the CRK sensor 20 generates a CRK pulse signal representing the rotational position of the crankshaft. Accordingly, the stopped position information acquirer 110 can acquire a stopped crankshaft angle each time that a predetermined time period has passed, and store the acquired stopped crankshaft angle in the ROM 124. Therefore, even if the crankshaft rotates while the engine 14 is in a stopped condition, the stopped crankshaft angle that is acquired can be updated. Consequently, the stopped position information acquirer 110 can acquire an accurate stopped crankshaft angle of the engine 14 by acquiring the crankshaft angle as a stopped crankshaft angle immediately before the engine 14 is started or restarted.

The stopped position information acquirer 110 judges whether or not the engine 14 has stopped in the following manner. The stopped position information acquirer 110 monitors the engine rotational speed calculated by the engine rotational speed calculator 122. If the monitored engine rotational speed is substantially 0, then the stopped position information acquirer 110 judges that the engine 14 has stopped. On the other hand, if the start judgment section 112 supplies starting judgment information thereto, then the stopped position information acquirer 110 judges that starting or restarting of the engine 14 has begun, and terminates the aforementioned process of acquiring crankshaft angle information.

Because of variations in accuracy that the CRK sensor 20 suffers from, the crankshaft angle calculated by the crankshaft angle information generator 108 and the actual crankshaft angle of the crankshaft may differ from each other by ±several pulses in terms of the CRK pulse signal. When the actuator ECU 26 establishes a time to start controlling the ACMs 16f, 16r in synchronism with vibrations (rolling resonance) of the vehicle body 18, which are caused by rolling natural vibrations that are generated when the engine is started or restarted, it is necessary for the actuator ECU 26 to correct the different crankshaft angle, and thereafter, to establish a time at which controlling of the ACMs 16f, 16r is started based on the corrected crankshaft angle.

According to the present embodiment, when the stopped position information corrector 114 detects a first change in the TDC pulse signal, i.e., an edge of a first TDC pulse, after the engine 14 has been started or restarted, the stopped position information corrector 114 detects positional information of the crankshaft depending on the pulse of the TDC pulse signal at the time of detection thereof (hereinafter referred to as "switching crankshaft position information"), and regards the crankshaft angle (hereinafter referred to as a "switching crankshaft angle") represented by the detected positional information as an accurate angle.

A pulse edge, which indicates a time of switching from one pulse to another of the TDC pulse signal, corresponds to a time of switching from one cylinder to another, and a switching crankshaft angle depending on such a time of switching is uniquely determined. Therefore, the starting crankshaft angle can be corrected accurately using the switching crankshaft angle as a reference.

The edge of a TDC pulse may be a positive-going edge or a negative-going edge, insofar as the switching crankshaft angle can be acquired upon the occurrence of an edge.

Inasmuch as the ROM 124 stores stopped position information and starting judgment information, the stopped position information corrector 114 back-calculates and acquires a pulse (stopped crankshaft angle) of a CRK pulse signal at the time that the engine 14 is started or restarted, using an accurate switching crankshaft angle. As a result, it is possible to acquire an accurate stopped crankshaft angle (hereinafter also referred to as a "starting crankshaft angle") at the time that the engine 14 is started or restarted.

The stopped position information corrector 114 updates the stopped position information including the corrected starting crankshaft angle into new stopped position information, which is stored in the ROM 124. More specifically, as described above, since the calculated crankshaft angle may differ from the actual crankshaft angle, the stopped position information corrector 114 performs an initiation process for detecting a switching crankshaft angle, which is used to correct the starting crankshaft angle. Accordingly, the starting crankshaft angle is corrected into an accurate starting crankshaft angle using the detected switching crankshaft angle.

As described above, when the initiation process for identifying an accurate starting crankshaft angle is performed at the time that the engine 14 is started or restarted, the actuator ECU 26 establishes the timing at which controlling of the ACMs 16f, 16r is started using the starting crankshaft angle obtained by the initiation process, and starts to control the ACMs 16f, 16r accurately.

The CRK pulse signal includes a pulse-free period, i.e., a period during which no pulses occur, corresponding to the area of the rotor coupled to the crankshaft that is free of gear teeth. The pulse-free period of the CRK pulse signal is used to control the engine 14. The CRK signal includes a pulse-free period within every predetermined angular interval.

After elapse of the pulse-free period, the stopped position information corrector 114 can acquire a pulse of the CRK pulse signal, which corresponds to an edge of the first-acquired TDC pulse. Accordingly, the stopped position information corrector 114 can more accurately perform the initiation process for recognizing a starting crankshaft angle using a switching crankshaft angle depending on the acquired pulse.

However, according to the present embodiment, as described above, since the initiation process can be expedited by acquiring a switching crankshaft angle without the need for detecting a pulse-free period of the CRK pulse signal, it is possible both to increase accuracy and to start controlling the ACMs 16f, 16r at an early time.

Figure 4:
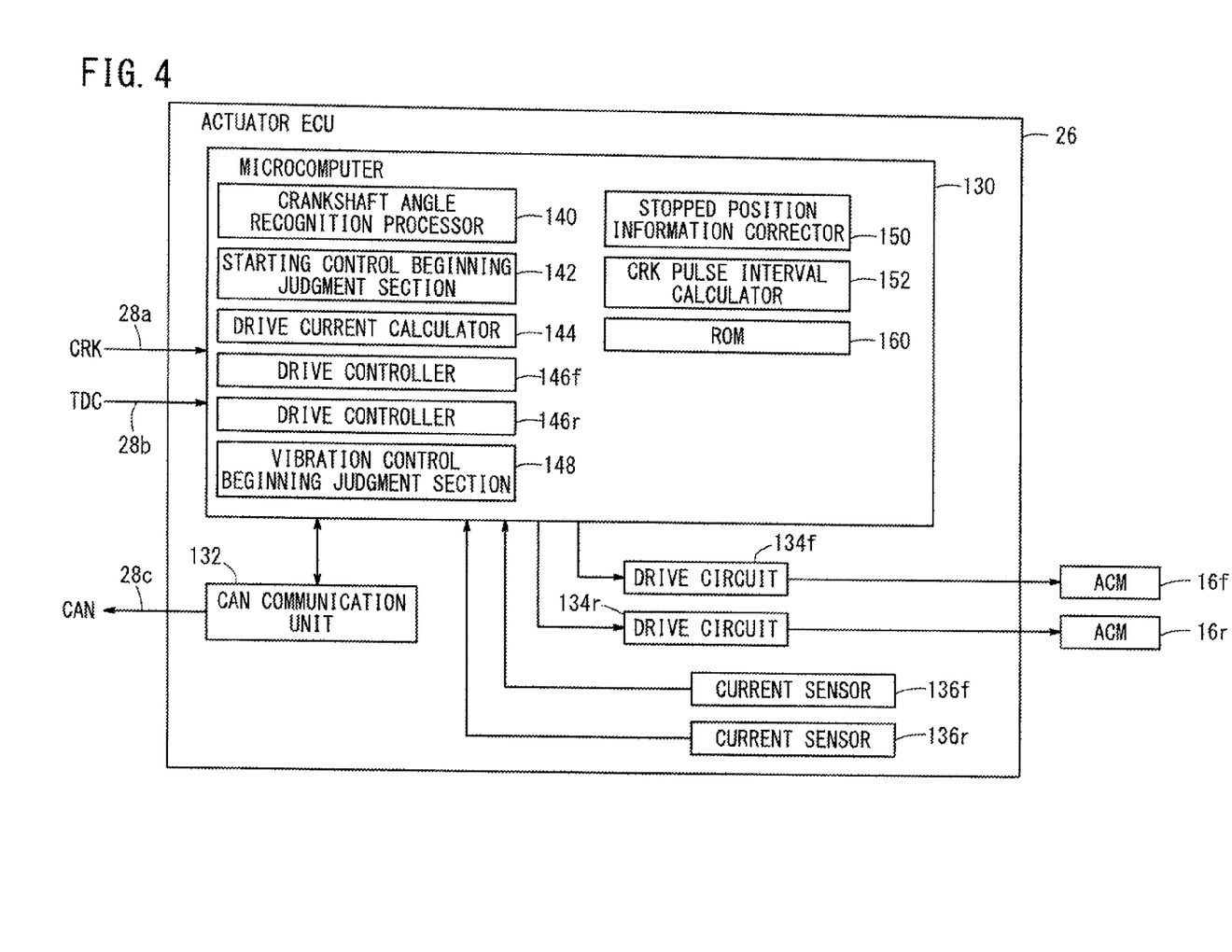
FIG. 4 is a block diagram of an actuator ECU (Actuator Control Unit) shown in FIG. 1.

As described later, the actuator ECU 26 includes a stopped position information corrector 150 (correcting unit), which has the same functions as the stopped position information corrector 114.

According to the present embodiment, any one of the following patterns (1) through (3) described below may be employed. The initiation process, which is required for the actuator ECU 26 to establish the timing at which controlling of the ACMs 16f, 16r is started, may be carried out by either one of the actuator ECU 26 or the engine ECU 24.

(1) Each of the respective stopped position information correctors 114, 150 performs the initiation process for recognizing a starting crankshaft angle, and each of the actuator ECU 26 and the engine ECU 24 performs necessary processes using the starting crankshaft angle that was recognized by the initiation process.

(2) The stopped position information corrector 114 performs the initiation process for recognizing a starting crankshaft angle, and sends the result of the initiation process to the actuator ECU 26 through the CAN communication line 28c. Both the actuator ECU 26 and the engine ECU 24 use the starting crankshaft angle, which was recognized by the initiation process performed by the stopped position information corrector 114.

(3) The stopped position information corrector 150 performs the initiation process for recognizing a starting crankshaft angle, and sends the result of the initiation process to the engine ECU 24 through the CAN communication line 28c. Both the actuator ECU 26 and the engine ECU 24 use the starting crankshaft angle, which was recognized by the initiation process performed by the stopped position information corrector 150.

When the engine 14 stops operating, the microcomputer 100 preferably stops controlling the engine 14 such that none of the pistons in any of the cylinders stops at a TDC (top dead center) position, i.e., the pistons will be stopped at positions other than the TDC position, and the camshaft will not stop at a rotational position at which a pulse edge of the TDC pulse signal is detected. In this manner, a pulse edge occurs within a short period of time after the engine 14 is started or restarted, thereby making it possible to acquire the crankshaft angle quickly and accurately.

The fuel injection controller 116 sets an amount of fuel to be injected (fuel injection time) depending on the engine rotational speed, and controls the injectors of the operational cylinders so as to inject fuel into the cylinders based on a fuel injection start timing map, which is preset depending on the timings of the CRK pulse signal and the TDC pulse signal that were stored in the ROM 124.

When the engine 14 is started or restarted, the fuel injection controller 116 confirms that the rotational engine speed in the motoring period has reached a suitable ignition speed, based on a crankshaft angle from the stopped crankshaft angle at the time that the engine 14 has initiated starting or restarting (starting crankshaft angle) and the engine rotational speed calculated by the engine rotational speed calculator 122. At the same time, based on the CRK pulse signal and the TDC pulse signal, the fuel injection controller 116 determines which cylinder is to be fired first, and performs a control process for controlling the injectors to inject fuel successively into the cylinders.

The ignition timing controller 118 establishes ignition timings for the respective cylinders based on an ignition timing map, which is preset depending on the crankshaft angle from the starting crankshaft angle and the engine rotational speed stored in the ROM 124.

Inasmuch as the stopped position information correctors 114, 150 perform the initiation process for recognizing a starting crankshaft angle, as described above, the fuel injection controller 116 can determine which cylinder is to be fired first, and perform a control process for starting to inject fuel from the determined cylinder, based on the starting crankshaft angle recognized by the initiating process. Further, the ignition timing controller 118 can establish ignition timings for the respective cylinders based on the starting crankshaft angle recognized by the initiation process.

Apart from the CRK pulse signal and the TDC pulse signal, the CAN communication unit 102 sends various items of information, e.g., the stopped position information and the starting judgment information, to the actuator ECU 26 through the CAN communication line 28c, and also receives various items of information from the actuator ECU 26 through the CAN communication line 28c.

The injector drive circuit 104 is controlled by the microcomputer 100 in order to control the injectors of the cylinders of the engine 14.

[Configuration of Actuator ECU]

As shown in FIG. 4, the actuator ECU 26 for controlling the ACMs 16f, 16r has a microcomputer 130, a CAN communication unit 132, drive circuits 134f, 134r, and current sensors 136f, 136r.

In addition to a ROM 160, the microcomputer 130 has a crankshaft angle recognition processor 140, a starting control beginning judgment section 142, a drive current calculator 144, drive controllers 146f, 146r, a vibration control beginning judgment section 148, a stopped position information corrector 150, and a CRK pulse interval calculator 152, which are implemented as software functions.

The starting control beginning judgment section 142 judges whether or not the engine 14 has been started or restarted based on the starting judgment information sent from the engine 14 through the CAN communication line 28c and the CAN communication unit 132.

If the starting crankshaft angle in the stopped position information deviates by ±several pulses, the starting control beginning judgment section 142 judges that the engine 14 has been started or restarted, and stopped position information and starting judgment information supplied from the engine ECU 24 through the CAN communication line 28c and the CAN communication unit 132 are stored in the ROM 160. Thereafter, when an edge of a first TDC pulse occurs immediately after the engine 14 has been started or restarted, the stopped position information corrector 150, similar to the stopped position information corrector 114, detects as a switching crankshaft angle a crankshaft angle represented by a CRK pulse acquired at the pulse edge.

The stopped position information corrector 150 regards the detected switching crankshaft angle as accurate rotational position information of the crankshaft. The stopped position information corrector 150 corrects the starting crankshaft angle using the switching crankshaft angle as a reference, and updates the stopped position information including the corrected starting crankshaft angle into new stopped position information, which is stored in the ROM 124.

If the starting control beginning judgment section 142 judges that the engine 14 has been started or restarted, then the starting control beginning judgment section 142 identifies a stopped crankshaft angle, i.e., a starting crankshaft angle, at the time that the engine 14 is started or restarted, based on the stopped position information sent from the engine 14 through the CAN communication line 28c and the CAN communication unit 132. In other words, in order to identify the beginning timing of the vibration suppressing control process, the crankshaft angle recognition processor 140 performs an initiation process for recognizing a crankshaft angle (starting crankshaft angle) that serves as a starting point of the vibration suppressing control process for suppressing vibrations of the vehicle body 18 due to rolling natural vibrations.

As described above, since the stopped position information correctors 114, 150 update and store the new stopped position information with the corrected starting crankshaft angle in the ROM 160, the starting control beginning judgment section 142 can accurately identify a starting crankshaft angle based on the updated new stopped position information.

When the engine 14 is started or restarted at the identified starting crankshaft angle, the crankshaft angle at the start time of the rolling natural vibrations is determined uniquely in relation to the starting crankshaft angle at the time that the engine 14 is started or restarted. If the starting crankshaft angle at the time that the engine 14 is started or restarted is different, the crankshaft angle, which is determined uniquely in relation to the starting crankshaft angle, also is different. As a result, the timing at which the vibration suppressing control process is started for suppressing vibrations of the vehicle body 18 due to rolling natural vibrations also is different.

Using the identified starting crankshaft angle, the crankshaft angle recognition processor 140 calculates a crankshaft angle (hereinafter referred to as a "beginning crankshaft angle") for beginning the vibration suppressing control process that suppresses vibrations of the vehicle body 18 due to rolling natural vibrations. Information concerning the identified starting crankshaft angle and the calculated beginning crankshaft angle are stored in the ROM 160, which comprises a nonvolatile memory such as an EEPROM or the like. Since the beginning crankshaft angle is identified based on the corrected starting crankshaft angle, the beginning crankshaft angle also is calculated accurately.

Similar to the crankshaft angle information generator 108, the crankshaft angle recognition processor 140 may count pulses of the CRK pulse signal, which is supplied to the microcomputer 130, and calculate a crankshaft angle from the counted pulses.

The beginning crankshaft angle can be set to any desired crankshaft angle between the starting crankshaft angle and the crankshaft angle at which rolling natural vibrations are produced. Hereinbelow, the crankshaft angle recognition processor 140 will set the crankshaft angle at which rolling natural vibrations are produced as the beginning crankshaft angle.

When the crankshaft angle calculated by the crankshaft angle recognition processor 140 reaches the beginning crankshaft angle, the vibration control beginning judgment section 148 decides to begin controlling the ACMs 16f, 16r. In other words, the vibration control beginning judgment section 148 begins the vibration suppressing control process for suppressing vibrations of the vehicle body 18 using the beginning crankshaft angle as a trigger.

The CRK pulse interval calculator 152 calculates a pulse interval of the CRK pulse signal based on an internal clock signal of the microcomputer 130, the CRK pulse signal, and the TDC pulse signal.

The drive current calculator 144 generates a target current waveform (command current waveform) for suppressing vibrations of the vehicle body 18 due to rolling natural vibrations of the engine 14, based on various items of information including the CRK pulse signal and the TDC pulse signal. For example, the drive current calculator 144 generates a command current waveform, which includes a direct current that flows during a period ranging from the starting crankshaft angle to the beginning crankshaft angle, and a repetitive pulsed current flowing after the beginning crankshaft angle.

The drive controllers 146f, 146r generate drive signals having PWM (Pulse Width Modulation) duty ratios depending on the command current waveform, and the generated drive signals are supplied to the drive circuits 134f, 134r. More specifically, the actuator ECU 26 performs a PWM control process for adjusting duty ratios of the drive signals, so as to make the drive currents supplied to the ACMs 16f, 16r closer to the command current waveform. The drive circuits 134f, 134r convert the drive signals supplied from the drive controllers 146f, 146r into drive currents, and supply the drive currents to the coils 80 of the ACMs 16f, 16r.

Consequently, the ACMs 16f, 16r move the movable members 66, etc., to predetermined positions during the period from the starting crankshaft angle at the time that the engine 14 is started or restarted to the beginning crankshaft angle. Thereafter, the ACMs 16f, 16r periodically move the movable members 66 vertically from the predetermined positions to positions that depend on the drive signals after the beginning crankshaft angle.

The current sensors 136f, 136r detect current values from the drive circuits 134f, 134r, and supply the detected current values to the microcomputer 130. Under a feedback control based on the supplied current values, the drive controllers 146f, 146r adjust the duty ratios of the drive signals, so as to make the drive signals closer to the command current waveform calculated by the drive current calculator 144, thereby changing the drive signals supplied to the drive circuits 134f, 134r.

[Vibration Suppressing Control Process of the Related Art and Problems Thereof]

The control apparatus 10, which is one type of vehicle control apparatus incorporated in the vehicle 12, is constructed as described above.

Prior to describing operations of the control apparatus 10, a vibration suppressing control process of the related art and problems thereof will be described below with reference to FIGS. 5 and 6. In the following description of the vibration suppressing control process of the related art, components thereof, which are identical to those of the control apparatus 10, will be referred to in combination with identical reference characters when necessary.

Figure 5:
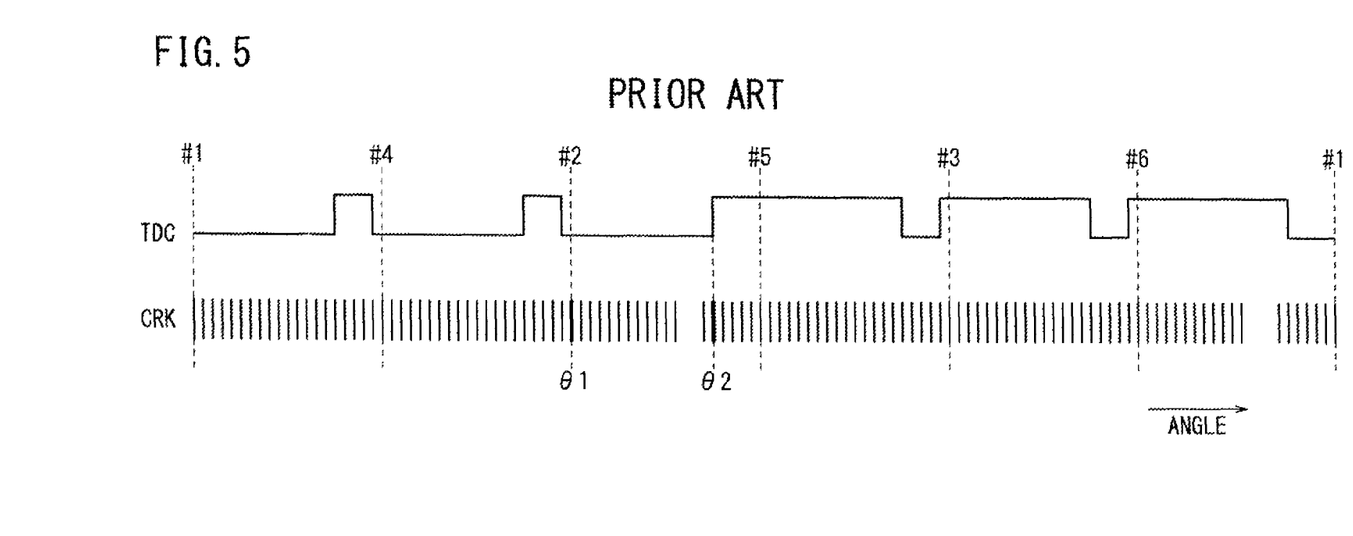
FIG. 5 is a timing chart showing by way of example a vibration suppressing control process according to the related art.

FIG. 5 is a timing chart showing by way of example a vibration suppressing control process according to the related art. FIG. 6 is a timing chart showing problems of the vibration suppressing control process according to the related art.

In FIG. 5, #1 through #6 indicate numbers for the respective cylinders of the engine 14.

Heretofore, an initiation process for accurately grasping a crankshaft angle has been carried out in relation to a pulse pattern (TDC) of the TDC pulse signal and a pulse pattern (CRK) of the CRK pulse signal.

More specifically, according to the related art, an operational cylinder (actual cylinder) is identified at a crankshaft angle $\theta 1$ where a pulse of the CRK signal is supplied immediately after two pulses of the TDC pulse signal have been detected, i.e., a pulse depending on a cylinder #4 and a pulse depending on a cylinder #2. Thereafter, the CRK pulse signal becomes a substantially 0 level corresponding to a pulse-free period. A pulse of the CRK pulse signal upon the occurrence of a pulse edge of the TDC pulse signal depending on a cylinder #5 is identified as an accurate crankshaft angle $\theta 2$. Then, an initiation process for identifying the crankshaft angle is performed using the identified pulse as a reference position.

According to the related art, therefore, the CRK pulse signal has a pulse-free period, which occurs after two pulses of the TDC pulse signal have been detected, and when an edge of a next pulse of the TDC pulse signal arrives subsequently thereto. A pulse of the CRK pulse signal, which is aligned with the edge, is identified as an accurate crankshaft angle $\theta 2$.

Figure 6:
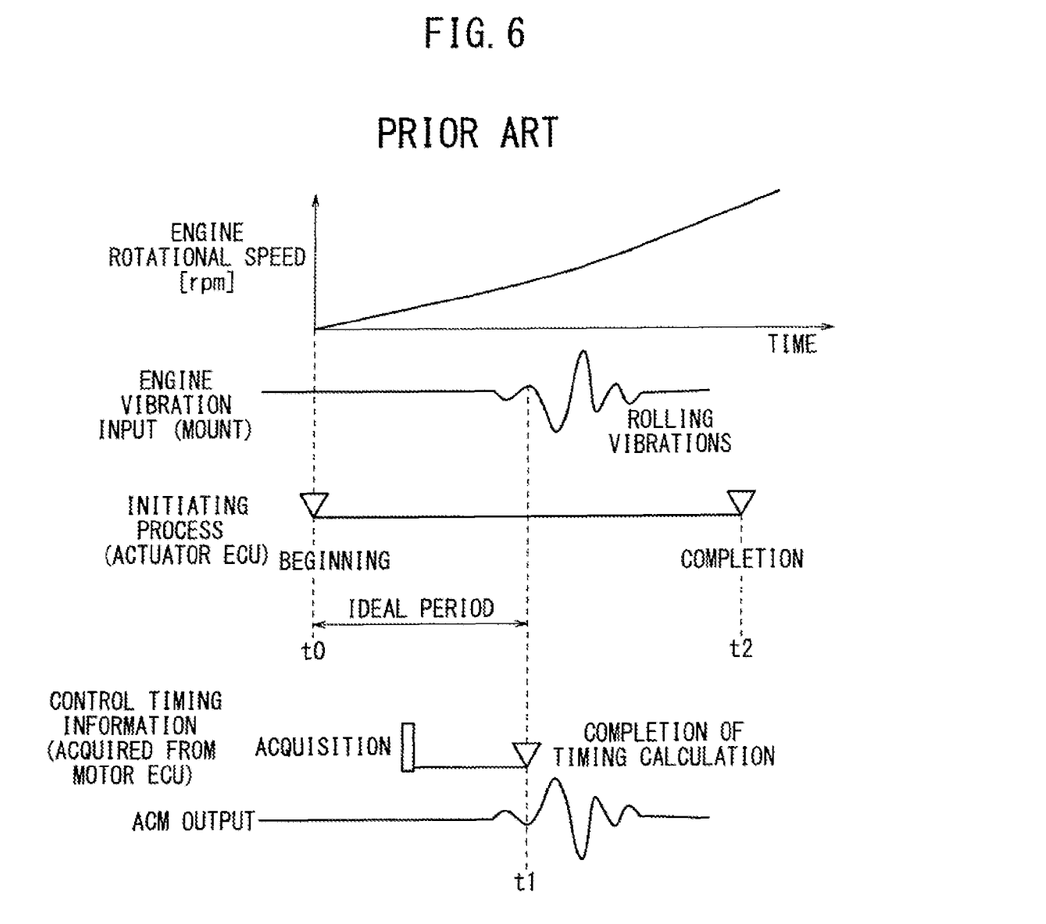
FIG. 6 is a timing chart showing problems of the vibration suppressing control process according to the related art.

If the above process is applied to a vibration suppressing control process for suppressing vibrations of the vehicle body 18 due to rolling natural vibrations of the engine 14, then as shown in FIG. 6, the initiation process, which has begun at time t0, consumes a certain period of time until completion thereof. Accordingly, the initiation process is completed at time t2, after vibrations of the vehicle body 18 are produced.

It is preferable for the initiation process to be completed within the period up to time t1 when rolling natural vibrations are produced, and after time t1, to control the ACMs 16f, 16r to generate forces in inverse phase with the vibrations of the vehicle body 18.

[Operations of the Present Embodiment]

Figure 7:
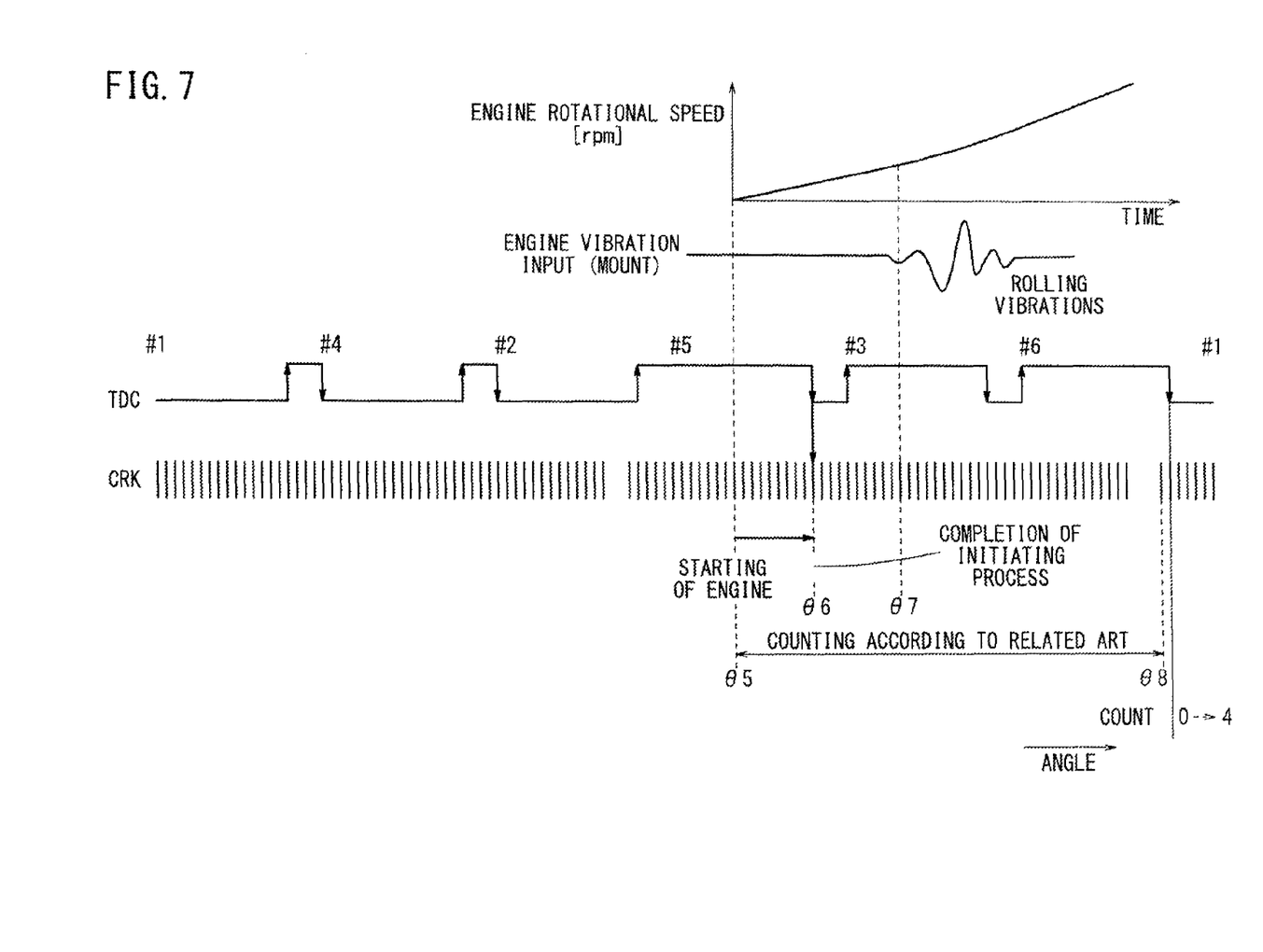
FIG. 7 is a timing chart showing a vibration suppressing control process according to the present embodiment.
Figure 8:
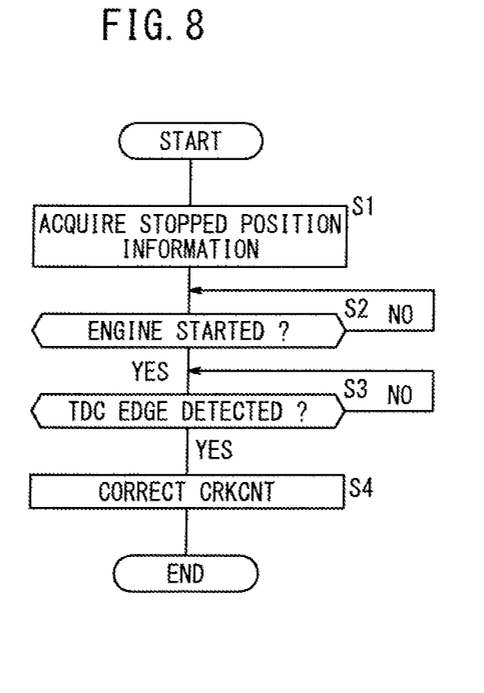
FIG. 8 is a flowchart of the vibration suppressing control process shown in FIG. 7.

Operations of the control apparatus 10 according to the present embodiment will be described below with reference to FIGS. 7 and 8.

Predetermined numbers are assigned respectively to the pulses of a pulse train of the CRK pulse signal, in view of the positional relationship of the CRK pulse signal to the TDC pulse signal. The crankshaft angle information generator 108 counts pulses of the CRK pulse signal, and acquires a crankshaft angle depending on the counted pulses as stopped position information (step S1 of FIG. 8).

In order for the engine 14 to stop operating, the engine 14 is controlled in order to make the camshaft stop between respective edges of a TDC pulse. According to the present embodiment, as shown in FIG. 7, the engine 14 is stopped at a crankshaft angle θ5, for example. However, the crankshaft angle θ5 is shown by way of example only. The engine 14 may be stopped at any desired crankshaft angle between the cylinders, other than at the edges and at the TDC position thereof.

If the engine 14 is started or restarted (step S2: YES), then the crankshaft starts rotating, and the TDC sensor 22 detects a first edge of the TDC pulse signal, i.e., the edge shown at #3 in FIG. 7 (step S3: YES).

More specifically, when the engine 14 is started or restarted (step S2: YES), based on the judgment result from the start judgment section 112, the crankshaft angle information generator 108 acquires a stopped crankshaft angle (starting crankshaft angle) at the time that starting or restarting of the engine 14 begins to take place.

As described above, due to variations in accuracy that the CRK sensor 20 suffers from, the crankshaft angle acquired by the crankshaft angle information generator 108 contains a variation of ±several pulses.

Next, the stopped position information correctors 114, 150 acquire positional information of the crankshaft angle at the time of arrival of the first edge (step S3: YES). For example, as shown in FIG. 7, the stopped position information correctors 114, 150 detect, as a switching crankshaft angle, a crankshaft angle θ6 at a pulse of the CRK pulse signal depending on the first edge. In other words, the stopped position information correctors 114, 150 regard the switching crankshaft angle θ6 as accurate positional information of the crankshaft angle.

Thereafter, using the switching crankshaft angle θ6 as a reference (step S4), the stopped position information correctors 114, 150 correct the starting crankshaft angle (the stopped crankshaft angle θ5 at the time that the engine 14 is started or restarted). More specifically, the stopped position information correctors 114, 150 correct a pulse depending on the starting crankshaft angle θ5, which includes a positional deviation of the crankshaft that occurs during stopping of the engine 14 and having a variation of ±several pulses, based on a pulse depending on the switching crankshaft angle θ6. Consequently, it is possible to acquire accurate positional information of the crankshaft angle θ5 at the time that the engine 14 is started, and to complete the initiation process for identifying the stopped crankshaft angle (starting crankshaft angle θ5) at the switching crankshaft angle θ6.

Since the stopped position information correctors 114, 150 update the stopped position information including the corrected starting crankshaft angle θ5 into new stopped position information that is stored in the ROMs 124, 160, using the corrected starting crankshaft angle θ5, the crankshaft angle recognition processor 140 can accurately calculate a beginning crankshaft angle θ7 at which rolling natural vibrations are produced. More specifically, according to the present embodiment, the start timing (beginning crankshaft angle θ7) of the ACMs 16f, 16r is established based on the accurate starting crankshaft angle θ5 at the time that the engine 14 is started, for example, a beginning crankshaft angle θ7 is calculated by adding a predetermined number (fixed value) of CRK pulses to the starting crankshaft angle θ5, and the ACMs 16f, 16r are controlled accurately.

According to the related art, the initiation process is completed at a crankshaft angle θ8, and then an edge corresponding to the cylinder #6 is detected. Consequently, the vibration suppressing control process is performed after rolling natural vibrations have been produced, so that vibrations of the vehicle body 18 cannot be suppressed effectively. On the other hand, according to the present embodiment, the vibration suppressing control process begins from the beginning crankshaft angle θ7 at a time prior to the occurrence of rolling natural vibrations, thereby making it possible to reduce vibrations of the vehicle body 18 efficiently and reliably.

With the present embodiment, according to the above vibration suppressing control process, since fewer pulses are counted in order to perform the initiation process, the period of time required, i.e., the period from the time that the engine 14 is started or restarted to the time when the initiating process is completed, can be reduced.

[Advantages of the Present Embodiment]

With the control apparatus 10 according to the present embodiment, as described above, the stopped position information correctors 114, 150 acquire a stopped crankshaft angle (starting crankshaft angle) of the engine 14, and correct the stopped crankshaft angle based on a crankshaft angle (switching crankshaft angle) that occurs upon switching between pulses of the TDC pulse signal.

A crankshaft angle, which occurs upon switching between pulses of the TDC pulse signal, is determined uniquely. According to the present embodiment, even if the stopped crankshaft angle suffers from variations in accuracy of the CRK sensor 20, the stopped crankshaft angle can be corrected based on the crankshaft angle (switching crankshaft angle) that occurs upon switching between pulses of the TDC pulse signal. Therefore, it is possible to acquire a stopped crankshaft angle (starting crankshaft angle) with high accuracy. In other words, any desired crankshaft angle can be identified accurately based on the corrected stopped crankshaft angle (starting crankshaft angle).

Further, when operation of the engine 14 is stopped, the engine 14 is stopped, i.e., each piston is stopped at a position except for the TDC position, and such that none of the pistons has reached the TDC position thereof (by adjusting the output of a hybrid vehicle motor or a starter motor). Therefore, even if the durations (pulse durations) of the TDC pulse signal differ from each other among the cylinders, it is possible to quickly determine which one of the cylinders has reached its TDC position at the time of arrival of a first pulse edge from the time at which the engine 14 is started or restarted. Such a control process makes it possible, from among the cylinders of the engine 14, to accurately and quickly recognize the present angular position of the crankshaft.

Since the rotational position of the crankshaft, i.e., the crankshaft angle, represents physical positional information, it is less likely to vary even if the engine 14 is started by different types of engine starters. Also, the rotational position of the crankshaft is less liable to deviate from the time at which the engine 14 produces rolling natural vibrations. Accordingly, the timing accuracy of the vibration suppressing control process is made higher than if the vibration suppressing control process were performed depending on engine rotational speed. Furthermore, inasmuch as the accuracy of the rotational position of the crankshaft is high at the time that the engine 14 stops operating, it is possible to accurately establish a predetermined rotational position from the crankshaft angle.

When the vibration suppressing control process carried out by the ACMs 16f, 16r begins from the beginning crankshaft angle, it is possible to efficiently suppress vibrations produced by rolling natural vibrations and which are transmitted from the engine 14 to the vehicle body 18.

An ignition timing of the engine 14 is established based on a switching crankshaft angle, which takes place at an edge of the TDC pulse signal. Therefore, the ignition timing can be acquired reliably.

Each of the stopped position information correctors 114, 150 performs the initiation process for recognizing a starting crankshaft angle. Therefore, the process of acquiring the starting crankshaft angle for establishing the ignition timing of the engine 14, and the process of acquiring a beginning crankshaft angle for establishing the beginning timing of the vibration suppressing control process are performed separately by the engine ECU 24 and the actuator ECU 26, respectively. As a result, the engine ECU 24 and the actuator ECU 26 can quickly and more accurately detect the crankshaft angle.

In other words, the engine ECU 24 including the stopped position information corrector 114 can improve safety by quickly establishing the ignition timing of the engine 14. Further, the actuator ECU 26 including the stopped position information corrector 150 can reliably suppress vibrations of the vehicle body 18 by quickly establishing the beginning timing of the vibration suppressing control process.

Although a preferred embodiment of the present invention has been described in detail above, it should be understood that the present invention is not limited to the illustrated embodiment, and various changes and modifications may be made to the embodiment without departing from the scope of the invention as set forth in the appended claims.

What is claimed is:

1. A control apparatus for a vehicle having a multi-cylinder engine including a crankshaft rotatably disposed therein and a camshaft rotatably disposed therein, comprising:
    a crankshaft position acquiring unit configured to acquire crankshaft position information representing a rotational position of the crankshaft at each predetermined angular interval in response to rotation of the crankshaft;
    a camshaft signal acquiring unit configured to acquire camshaft signals having different modes, which switch from one to another in association with cylinders of the engine that operate in successive combustion strokes, in response to rotation of the camshaft of the engine; and
    a correcting unit configured to correct the crankshaft position information acquired from the crankshaft position acquiring unit based on the camshaft signals acquired from the camshaft signal acquiring unit;
    wherein the correcting unit acquires from the crankshaft position acquiring unit stopped crankshaft position information, which is representative of crankshaft position information at a time that the engine stops operating;
    the correcting unit acquires from the crankshaft position acquiring unit switching crankshaft position information, which is representative of crankshaft position information at a time that the camshaft signals switch from one to another when the engine is started or restarted; and
    the correcting unit corrects the stopped crankshaft position information based on the acquired switching crankshaft position information.

2. The control apparatus according to claim 1, further comprising:
    an engine control unit configured to control the engine;
    wherein the engine control unit stops the engine such that none of the pistons in any of the cylinders stops at a top dead center position thereof when the engine is stopped; and
    the correcting unit acquires, as the switching crankshaft position information, crankshaft position information at the time that the camshaft signals switch from one to another for a first time after the engine has been started or restarted.

3. The control apparatus according to claim 1, further comprising:
    an engine control unit configured to control the engine;
    wherein the engine control unit stops the engine such that a rotational position of the camshaft when the engine is stopped will not be a rotational position at which the camshaft signals switch from one to another.

4. The control apparatus according to claim 1, the control apparatus being adapted to control an active vibroisolating support device which is mounted on a vehicle body and supports the engine, and which performs a vibration suppressing control process of suppressing vibrations transmitted from the engine to the vehicle body by energizing an actuator, further comprising:
    an actuator control unit configured to energize the actuator;
    wherein the actuator control unit includes the correcting unit;
    the actuator control unit acquires the stopped crankshaft position information from the crankshaft position acquiring unit;
    the actuator control unit establishes a predetermined rotational position of the crankshaft from the stopped crankshaft position information; and
    the actuator control unit begins the vibration suppressing control process by the actuator when a rotational position of the crankshaft, which is represented by the crankshaft position information acquired from the crankshaft position acquiring unit, reaches the predetermined rotational position, at the time that the engine is started or restarted.

5. The control apparatus according to claim 4, further comprising:
    an engine control unit configured to control the engine;
    wherein the engine control unit acquires the stopped crankshaft position information from the crankshaft position acquiring unit;
    the engine control unit acquires, as the switching crankshaft position information, crankshaft position information from the crankshaft position acquiring unit immediately after the camshaft signals have switched from one to another, after a pulse-free period in which the crankshaft position acquiring unit is incapable of acquiring crankshaft position information due to a gear-tooth-free area of the crankshaft, at the time that the engine is started or restarted;
    the engine control unit corrects the stopped crankshaft position information based on the acquired switching crankshaft position information; and
    the engine control unit establishes an ignition timing of the engine based on the corrected stopped crankshaft position information, and controls the engine based on the established ignition timing.

\* \* \* \* \*